United States Patent [19]
Bachelder

[11] 3,798,669
[45] Mar. 19, 1974

[54] PHOTOGRAPHIC APPARATUS AND PROCESS

[75] Inventor: Albert J. Bachelder, Lexington, Mass.

[73] Assignee: Polaroid Corporation, Cambridge, Mass.

[22] Filed: Sept. 5, 1972

[21] Appl. No.: 286,109

[52] U.S. Cl. .................. 354/174, 354/85, 354/354
[51] Int. Cl. ........................................... G03b 17/50
[58] Field of Search............. 95/11 R, 13, 19, 31 EL

[56] References Cited
UNITED STATES PATENTS

| | | | |
|---|---|---|---|
| 3,643,571 | 2/1972 | Erlichman | 95/13 X |
| 3,543,662 | 12/1970 | Erlichman | 95/13 X |
| 3,561,339 | 2/1971 | Erlichman | 95/13 |
| 3,682,076 | 8/1972 | Erlichman | 95/19 X |
| 3,481,261 | 12/1969 | Fischer et al. | 95/31 EL |
| 3,587,425 | 6/1971 | Biber | 95/31 EL X |
| 2,989,906 | 6/1961 | Rentschler | 95/31 EL X |

*Primary Examiner*—Richard M. Sheer

[57] ABSTRACT

A cassette capable of retaining a plurality of photographic film units in stacked relationship, the cassette comprising access ports through which the terminals of a battery contained in the cassette are capable of contacting integral electrical contacts in the camera. The access ports include battery terminal masks which prevent the accidental completion of an electrical circuit through the battery terminals. The camera is capable of employing the cassette and electrical contacts in the camera are adapted to engage the terminal-masks and contact the battery terminals through the access ports.

12 Claims, 6 Drawing Figures

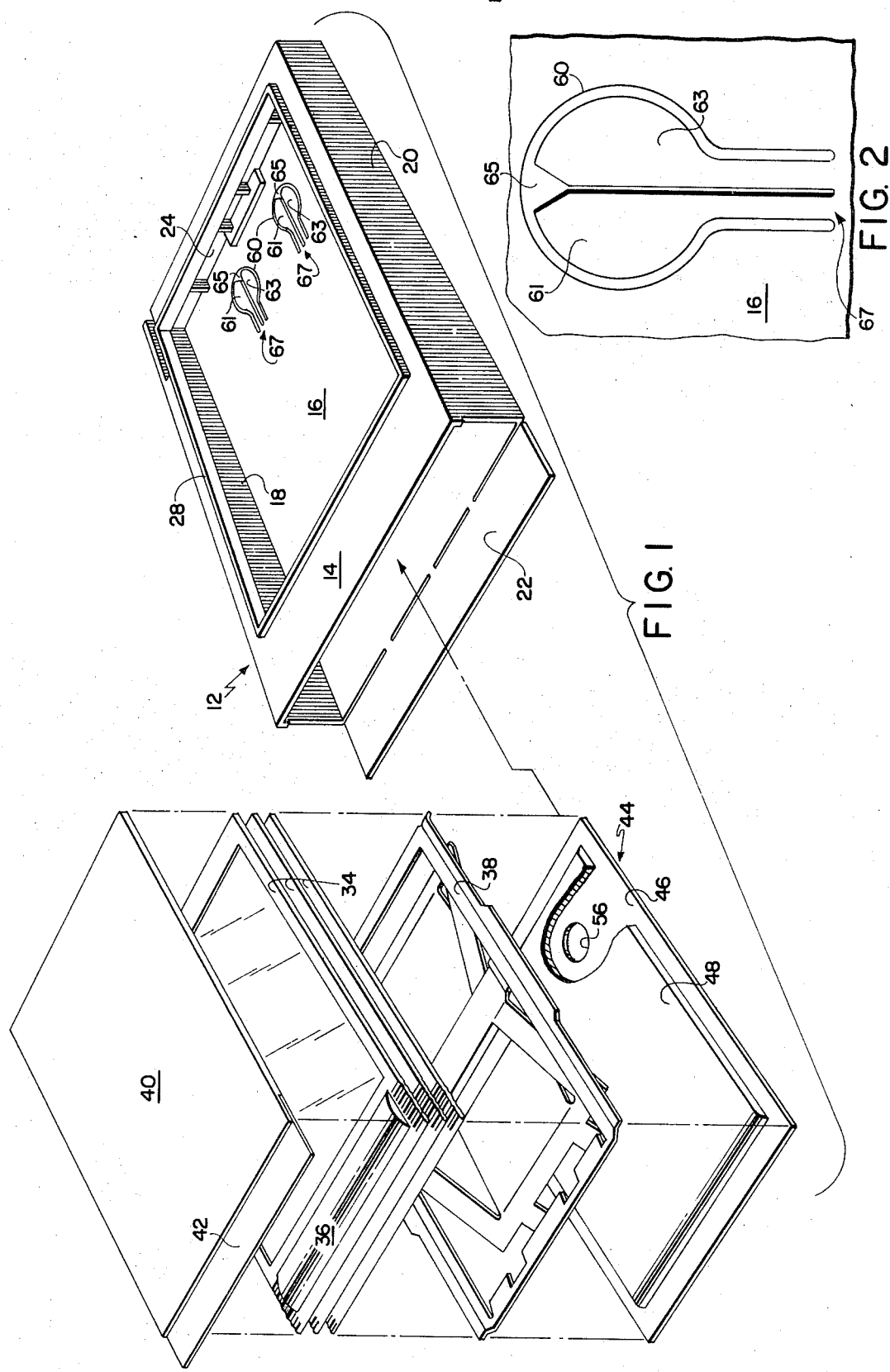

PHOTOGRAPHIC APPARATUS AND PROCESS

BACKGROUND OF THE INVENTION

This invention generally concerns improvements in interfacing a photographic film cassette, which includes a disposable battery, with a photographic camera having electrical components which are adapted to be energized by the battery.

The present invention is related to the teachings of U. S. Pat. No. 3,543,662, and copending U. S. patent application Ser. No. 136,071, filed Apr. 21, 1971 in the name of Richard Paglia, owned by the assignee of this application. The denoted patent discloses and claims the basic concepts of a photographic film cassette containing a battery which is discarded with the empty cassette and a photographic camera which interfaces with such a cassette and has electrical components adapted to be powered by the battery contained therein. It has been found that in such systems wherein the terminals of a battery are openly available to the environment in which the cassette in which it is contained is at rest outside of an interfacing photographic camera, there exists the possibility of accidently establishing an electrical circuit between the battery terminals and draining the battery of its energy. This invention concerns a solution to that problem.

OBJECTS OF THE INVENTION

It is an object of this invention to provide improved apparatus for interfacing a photographic film-containing cassette, including a disposable battery, with a photographic camera containing electrical components adapted to be powered by such a battery.

It is another object of this invention to provide a photographic film cassette comprising integral access ports between the terminals of a battery contained therein and mating electrical contacts of a camera capable of conducting electrical energy to various camera systems.

It is yet another object of this invention to provide masking means integral with said battery terminal access ports, which means is capable of engagement with camera electrical contact means and providing access by said electrical contact means to said battery terminals, while preventing the accidental establishment of an electrical circuit through said battery terminals outside a mating photographic camera environment.

Further objects and advantages of this invention will in part be obvious and will in part become apparent as the following description proceeds. The features of novelty which characterize the invention will be pointed out with particularity in the claims annexed to and forming a part of this specification.

BRIEF DESCRIPTION OF THE DRAWINGS

For a fuller understanding of the present invention, reference may be had to the following detailed description taken in connection with the accompanying drawings wherein:

FIG. 1 is an exploded perspective view, partly broken away, showing a photographic film cassette embodying the present invention;

FIG. 2 is a bottom view, partly broken away, of the cassette of FIG. 1 depicting the preferred battery terminal masking means;

DESCRIPTION OF THE PREFERRED EMBODIMENTS

Figure 3:
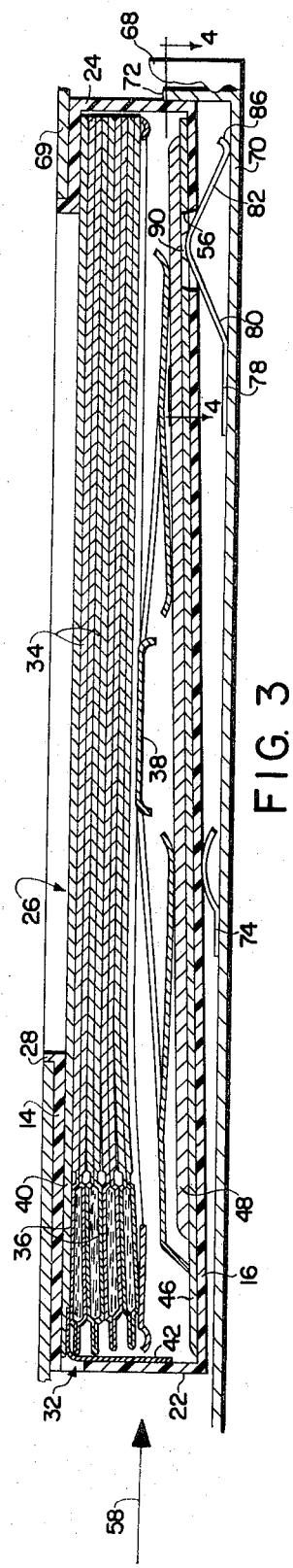
FIG. 3 is a sectional view showing the FIG. 1 cassette as it might appear fully assembled and loaded in a camera back having interfacing apparatus constructed according to this invention.

FIGS. 1 through 5 depict a preferred one of the many possible implementations of the present invention. As suggested above, this invention is particularly concerned with the provision of means for interfacing a photographic film cassette containing a battery with a photographic camera adapted to receive the cassette and be powered by the battery.

In the embodiment illustrated in FIGS. 1 through 5, a film cassette is depicted as comprising a generally six-sided housing 12 (of injection molded plastic, for example) having a top wall 14, a bottom wall 16, side walls 18 and 20, and end walls 22 and 24. The housing 12 is tapered convergently in the direction of cassette insertion into a receptive camera in order to accommodate asymmetries in the contents of the cassette and assure its proper insertion into the camera.

The top wall 14, which may be considered the forward wall of the cassette relative to the direction of impingement of image-producing light, defines an exposure opening 26 through which light may be conducted toward photosensitive materials contained with the cassette. The exposure opening 26 is surrounded by an outwardly extending mouth 28 serving to assure a proper rest position of the cassette when inserted into enclosure means defining a camera film-receptive chamber and to improve the light seal of the cassette within, and in conjunction with, the camera.

The housing end wall 22 is initially open during assembly of the cassette and its contents, as shown in FIG. 1, to allow insertion of the cassette contents into the housing. After insertion of the housing contents has been completed, the end wall 22 is secured permanently to the housing, for example, by the use of an ultrasonic welding operation. A slit 32 formed between the upper edge of the end wall 22 and the top wall 14 of the housing 12 permits withdrawal of film units from the cassette. The preferred assembly technique is described in U. S. patent application Ser. No. 136,070, filed Apr. 21, 1971 in the name of Louis O. Bruneau, assigned to the same assignee as the instant application.

The primary content of the cassette is a stack of film units 34 which are shown as being of the "self-developing" type, including a pod 36 containing processing fluid which is deployed to effect development of latent images formed in the photosensitive layer(s) of the film units.

A spring platen 38 beneath the film units 34 acts to urge the film units 34, in succession, into a proper attitude for exposure beneath the opening 26. A dark slide 40 having a depending curtain 42 on one end thereof acts to prevent fogging of the film units 34 prior to use of the cassette.

The cassette contains a battery 44 which is disposed adjacent the bottom wall 16 of the casing 12 beneath the spring platen 38. In the illustrated embodiment, the battery 44 is shown as comprising a card 46 which is preferably of a relatively stiff cardboard or similar material, and carries an electrochemical cell assembly 48 having (as shown in FIG. 5) positive and negative terminals 50 and 52. The card 46 has a pair of openings 54 and 56 disposed in side-by-side relationship (relative to the direction of cassette insertion illustrated by arrow 58 in FIG. 3). As shwon clearly in FIG. 5, the openings 54 and 56 are spaced such that they register with the positive and negative terminals 50 and 52 and with camera electric contact means 75 and 85 (shown in FIG. 4).

The bottom wall 16 of housing 12 defines a pair of access ports 60 which are adapted to register with exposed terminals 50 and 52 of battery 44 through openings 54 and 56 in battery card 56. Integral with at least one of said access ports 60 is the preferred exposed terminal masking means comprising leaves 61 and 63, the periphery of which generally follow the contour of access port 60. At the point where leaves 61 and 63 approach the leading edge of access port 60, each leaf is slightly beveled thereby forming, in conjoinder with one another, a "V" shaped indentation 65. Leaves 61 and 63 are cantilevered at the trailing edge of access port 60 so that a force applied to the V 65 in the direction of the trailing edge will cause leaves 61 and 63 to rotate in opposite directions, thereby enlarging the width of slit 67, which runs between leaves 61 and 63 and is defined thereby. The limit of rotation of leaves 61 and 63 is the periphery of access port 60.

Figure 4:
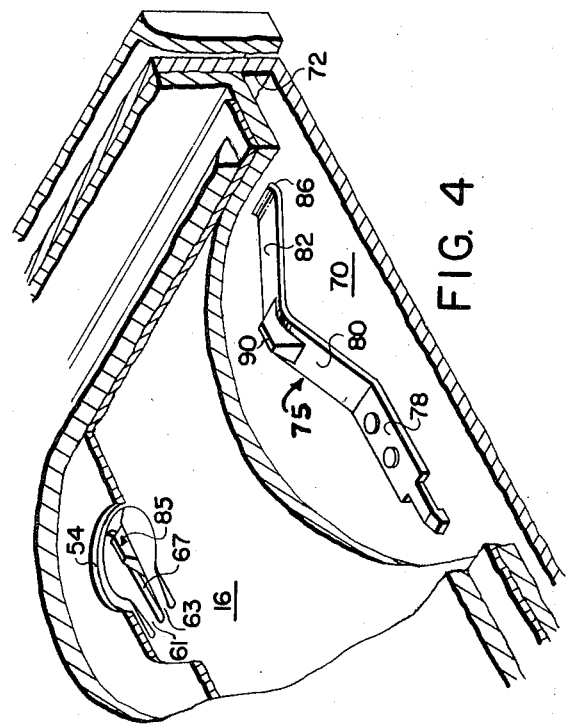
FIG. 4 is a perspective view of a cut-away generally along lines 4—4 in FIG. 3, broken away to reveal otherwise hidden components.
Figure 5:
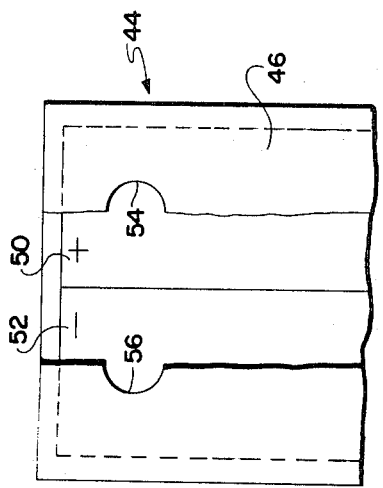
FIG. 5 is a top, partly cut-away view of a battery adapted for use in the present invention.

FIGS. 3 and 4 illustrate a portion of a film-receptive chamber comprising part of a back 68 of a photographic camera. The film-receptive chamber comprises an enclosure means defined in part by a forward wall 69 and a rear wall 70. An opening in the forward wall 69 receives the mouth 28 on the cassette top wall 14 to assure a proper rest location of the cassette within the film chamber.

A stop 72 limits the travel of the cassette into the film-receptive chamber. A leaf spring 74 secured to the inner surface of the chamber rear wall 70 acts to urge the cassette against the chamber forward wall 69 as the cassette is being inserted into the film-receptive chamber.

In accordance with the present invention, electrical contact means are provided for interfacing the camera electrical system with the battery 44 contained in the cassette and for assisting in implementing cassette entry guidance. In the illustrated embodiment in FIG. 4, a pair of contact means 75, 85 are shown since both contact means are identical in construction and function in exactly the same manner, only contact means 75 will be described in detail. Contact means 75 is in the form of an electrically conductive leaf spring contact 78 affixed at one end to the rear wall 70 of the film chamber. In the illustrated embodiment, the leaf spring contact 78 has the general configuration of an inverted V and is mounted so as to define a forward ramp portion 80 extending obliquely with respect to the chamber rear wall 70. The ramp portion 80 defines a ramp upon which the leading edge of the cassette (represented here by the bottom edge of end wall 24) rides as the cassette is inserted into the film chamber.

The leaf spring contact 78, by the creation of this ramping effect, directs the top wall 14 of the cassette into intimate engagement with the forward wall 69 of the film-receptive chamber and registers the mouth 28 with the window in wall 69 to assure that the film units 34 are situated in the focal plane of the camera objective (not shown) during exposure.

The leaf spring contact 78 is constructed to have a rear ramp portion 82 with a free end which may slide on the rear wall 70 of the film-receptive chamber, thus allowing the leaf spring contact 78 to deflect downwardly as the leading end of the cassette passes over them during cassette insertion.

The rear ramp portion 82 on the leaf spring contact 78 acts to assist in providing a smooth and positive action as the cassette is withdrawn from the film chamber.

The leaf spring contact 78 has at its apex (at the junction of the forward and rear ramp portions), a generally pyramidal contact element 90, comprising a highly electrically conductive material such as silver, and is adapted to apply counter rotational forces to leaves 61 and 63 upon contacting conjoined V 65. As cassette insertion continues, the contact element apex engagement with leaves 61 and 63 renders terminals 50 and 52 vulnerable to contact and, upon completion of insertion of the cassette into the camera, renders the battery integral with, and adapted to power, the camera circuitry. While generally pyramidal contacts are suggested for employment in the preferred embodiment, contacts having other configurations, e.g. round, may be utilized with excellent engagement efficiency.

In operation, as the cassette is inserted into the camera film chamber, the leaf spring 74 urges the forward end of the cassette toward the forward wall 69 of the film chamber. As the forward end passes the leaf spring 74 it is apt to have a tendency to drop toward the rear wall 70 of the chamber, particularly if the camera is being held in a horizontal position as shown in FIG. 2. However, by the lifting effect of the forward ramp position 80 of leaf spring contact 78, the forward end of the cassette is raised, causing the mouth 28 on the cassette top wall 14 to be inserted into the window in the chamber forward wall 69 and further assuring proper positioning of the cassette intimately against the rear surface of the chamber forward wall 69.

As the cassette reaches the limit of its travel, as defined by stop 72, the leaf spring contact 78 (has been deflected by the cassette against its inherent restorative force) returns toward its undeflected state, rotating aside leaves 61 and 63, and, reacing through the access port 60 in the casing bottom wall 16 and the opening 56 in the battery card 46, make firm physical and electrical engagement with the battery terminal 52. Upon removing the cassette from the camera, the leaves 61 and 63 return to their initial positions and prevent the establishment of an accidental electrical circuit between battery terminals.

Figure 6:
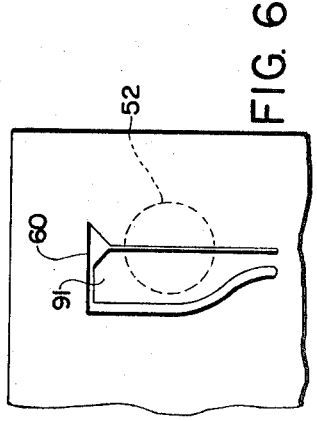
FIG. 6 is a bottom view, partly broken away and of reduced scale, of a cassette emphasizing an alternate access port masking means.

While the present invention has been descirbed with respect to a dual-conjoining-leaf-configured masking means, it should be understood that any suitable battery terminal masking means, such as that depicted in FIG. 6, for example, is contemplated thereby. With respect to FIG. 6, electrical contact between the camera and the exposed battery terminal is accomplished by rotating leaf 91 using camera electrical contact 90 to provide rotational stimulus and render exposed terminal 52 susceptible to contact by camera electrical contact 90. Means such as flexible flaps, bias-loaded slides, etc. are also naturally contemplated by the present invention and included within its scope. It is most preferred, however, that the masking means utilized substantially wholly reside within the plane of the bottom wall of the cassette so that it may be employed without alteration of a photographic camera into which it is to be inserted.

In the most preferred embodiment of the masked access ports depicted in FIG. 1, the radius of the circular portion is about 0.380 inch; the distance between the port edge and conforming leaf surface is about 0.170 inch; the gap between the leaves is about 0.015 inch; the access port stem width is about 0.250 inch; the dimension from the access port circle center to the furthermost stem extremity is about 0.770 inch; and the wide end of the conjoined V is about 0.15 inch. As denoted above, the cassette of the present invention is preferably molded. Formation of the preferred masking means of the present invention is accordingly accomplished by a minor alteration of the molding dies to produce the requisite voids in the cassette bottom wall. Alternatively, the voids may be produced by conventional plastic punching means, etc.

While the present invention has been described with respect to the employment of battery terminal-masking means integral with both cassette access ports, it is evident that the objects of the present invention may be satisfied by employing the described masking means over only one battery terminal. Since only one terminal will then be available for accidental contact, an inadvertant power drain is obviated. In either event, a primary feature of the present invention is the employment of battery terminal-masking means associated with cassette access ports, which masking means is capable of moving from a first position in which it prevents the establishment of an electrical circuit through battery terminals in registration with the access ports, to a second position in which the establishment of a circuit through the access ports is facilitated.

The present invention is not limited to the particular details of construction of the embodiments depicted, and it is contemplated that various and other modifications and applications will occur to those skilled in the art. Therefore, because certain changes may be made in the above-described apparatus without departing from the true spirit and scope of the invention herein involved, it is intended that the subject matter of the above depiction shall be interpreted as illustrative and not in a limiting sense.

I claim:

1. A photographic film cassette for storing film for exposure in a photographic camera comprising an enclosure means adapted to receive said cassette, the enclosure means comprising electrical contact means, said cassette comprising:

a housing including a wall having an exposure opening therein, and a wall having access ports therein said cassette being adapted to retain a battery adjacent said wall having said access ports, such battery comprising terminals which, when positioned in said cassette, register with said access ports;

at least one of said access ports having battery terminal-masking means therein movable from a first position to a second position and capable of preventing the establishment of an electrical circuit through the battery terminals when said terminal-masking means is in said first position;

means within said housing for mounting said battery terminal-masking means in a position within said access port to be engaged by means associated with the photographic camera enclosure means in order to move said terminal-masking means from said first position to said second postion to facilitate the completion of an electrical circuit through the battery terminals and the electrical contact means when said cassette is positioned in the camera enclosure means, and for moving said battery terminal-masking means from said second position to said first position when said cassette is removed from engagement with the means associated with the photographic apparatus enclosre means which moves said masking means from said first to said second position.

2. The invention of claim 1 wherein the means associated with the enclosure means is the electrical contact means.

3. The invention of claim 2 wherein said battery terminal-masking means comprises at least one cassette-integral cantilevered leaf capable of engagement with the camera electrical contact means whereby force applied to said leaf by the camera electrical contact means imparts sufficient rotational motion to move said leaf from said first position to said second position to expose the battery terminal in registration with said access port having said masking means to intimate contact with the camera electrical contact means.

4. The invention of claim 3 wherein said battery terminal-masking means comprises two leaves capable of counter-rotation upon the application of rotational stimulation by the camera electrical contact means.

5. The invention of claim 4 wherein said battery terminal-masking means comprise leaves which, in conjoinder, form a generally V shaped notch to enhance engagement with the camera electrical contact means, said leaves defining a narrow slit therebetween which widens upon counter-rotation of the leaves from said first position to said second position to facilitate contact bewteen the camera electrical contact means and the battery terminal in registration with said access port having said battery terminal-masking means.

6. The invention of claim 2 wherein said cassette comprises two access ports.

7. The invention of claim 6 wherein only one of said access ports has said integral battery terminal-masking means.

8. The invention of claim 2 wherein said housing is generally six-sided.

9. The invention of claim 2 wherein said wall having the exposure opening is the top wall of said housing and the access ports are located in the opposed wall of said housing.

10. A photographic film cassette having retained therein a plurality of film units in stacked relationship for successive exposure in a photographic camera comprising enclosure means adapted to receive said cassette, the enclosure means comprising electrical contact means, said cassette comprising:

a housing including a wall having an exposure opening therein, and a wall having access ports therein said cassette being adapted to retain a battery adjacent said wall, having said access ports, the battery comprising terminals which, when positioned in said cassette, register with said access ports;

at least one of said access ports having battery terminal-masking means therein movable from a first position to a second position and capable of preventing the establishment of an electrical circuit through the battery terminals when said terminal-masking means is in said first position;

means within said housing for mounting said battery terminal-masking means in a position within said access port to be engaged by means associated with the enclosure means in order to move said terminal-masking means from said first position to said second position to facilitate the completion of an electrical circuit through the battery terminals and the electrical contact means when said cassette is positioned in the camera enclosure means, and for moving said battery terminal-masking means from said second postion to said first position when said cassette is removed from engagement with the means associated with the photographic apparatus enclosure means which moves said masking means from said first to said second positions.

11. In combination, a photographic camera comprising enclosure means adapted to receive a photographic film cassette, and a photographic film cassette for storing film for exposure in said camera, said enclosure means comprising electrical contact means, said cassette comprising:

a housing including a wall having an exposure opening therein, and a wall having access ports therein, a battery retained within said cassette adjacent said wall, having said access ports, said battery comprising terminals which, when positioned in said cssette, register with said access ports;

at least one of said access ports having battery terminal-masking means therein movable from a first position to a second position and capable of preventing the establishment of an electrical circuit through the battery terminals when said terminal-masking means is in said first position;

means associated with said enclosure means to engage and move said terminal-masking means from said first position to said second position to facilitate the completion of an electrical circuit through the battery terminals and said electrical contact means when said cassette is positioned in said camera.

12. The invention of claim 11 wherein said means associated with said enclosure means is said electrical contact means.

* * * * *